United States Patent Office 3,197,369
Patented July 27, 1965

3,197,369
COATED GELATIN CAPSULES
Arno Widmann and Kurt Heinz Bauer, Eberbach, Germany, assignors to R. P. Scherer G.m.b.H., Eberbach, Germany, a corporation of Germany
No Drawing. Filed Feb. 15, 1962, Ser. No. 173,327
Claims priority, application Germany, Feb. 15, 1961, Sch 29,902
14 Claims. (Cl. 167—64)

The present invention relates to gelatin capsules containing medicaments that resemble and conform to the size and configurations of conventional rectal suppositories, which are coated with films of substances that, when moistened, facilitate the administration of the gelatin capsule per anum or per rectum.

The products of the present invention are referred to in the title and herein as coated gelatin capsules or "gelatin rectal capsules" rather than "rectal capsules" capsules or "gelatin suppositories."

Although about seventy different bases or compositions for the preparation of suppositories have heretofore been marketed or available, difficulties have nonetheless been encountered in the preparation of an ideal suppository base from such prior compositions or mixtures thereof.

The preparation of a suppository that is a pharmaceutically elegant product and that is unaffected by and resistant to tropical climatic conditions, and processes that are reliable and trouble free by which such suppositories can be produced in large quantities at high production rates or speeds and will contain accurate dosages of medicaments, are two of the problems in this art which heretofore have not been solved in an entirely satisfactory manner.

Rectal capsules of various sizes and shapes (tapered, tear-like or pendant, rhombohedral, ovoid, or other configurations) prepared with a water-soluble casing or shell of gelatin or composed entirely of a gelatin composition through which a medicament is distributed or dispersed, which have been formed or produced by use of conventional rotary-die capsule-forming machines, are an improvement over heretofore known suppositories and alleviate both of the foregoing problems. Such gelatin capsules are resistant to tropical climates, can be produced in large quantities at high production speeds with a dosage tolerance of or accuracy within ±1%, and can be produced in shapes or configurations that do not vary substantially from capsule to capsule. However, in some cases, these gelatine rectal capsules, when administered per anum, adhere or stick to the moist or mucous anal tissues and do not pass freely by or through the anal sphincter. Moistening the capsule or applying a lubricating ointment or oil thereto does not satisfactorily prevent this objectionable adhesion or sticking. To overcome such objectionable adhesion or sticking and facilitate the administration of such gelatin capsules, we conceived the possibility of providing such gelatin capsules with films or coatings which possess, besides the desirable property of preventing such sticking, the following properties:

(1) Ability to withstand tropical climatic conditions, i.e., have a melting or softening point that is not below a temperature of about 122° F. (50° C.) and is resistant to sticking to and bleeding or diffusing into paper or cardboard or similar containers in which the said capsules have been packaged.

(2) Ability of capsules coated with such films, when packed closely together, to resist sticking to each other and to the container.

(3) The coating must be composed of and contain only physiologically or pharmaceutically acceptable and not objectional substances.

(4) The coating must be easily applicable to the capsule at high production speeds and no secondary or aftertreatment of the coated capsules should be necessary or required.

The compositions and processes described herein provide films or coatings to such gelatin rectal capsules which satisfy the foregoing requirements and permit the production of a pharmaceutically elegant product.

In accordance with this invention, a film composed of essentially water-emulsifiable greases, silicone greases or silicone waxes, polyethylene glycols, or other appropriate film-forming substance or substances, or mixtures of the same, preferably together with an emulsifying or wetting agent is applied to gelatin capsules containing a medicament. Gelatin capsules containing a medicament, when coated in accordance with this invention, are surrounded by a film that is essentially dry and continuous and is resistant to melting or softening at temperatures below about 50° C. When moistened with water or wetted by the moisture of mucous anal tissues, such coatings unexpectedly and invariably became slippery, a result which may be attributable to emulsification of the film-forming or lubricating agent with the water or moisture with which it has come into contact.

The coating or film that is deposited or formed on the gelatin in accordance with this invention readily forms an emulsion when it is subsequently moistened with water or by the moisture of the mucous anal tissues as the coated capsule passes the anal sphincter. Upon contact with such moisture, the coated gelatin capsule becomes slippery or capable of sliding so that it may be inserted or administered without any difficulty. The objectionable adhesion, irritation, or smarting previously observed with unwcoated capsules has thereby been completely eliminated.

The film or coating which is formed or deposited on the surface or shell of the gelatin rectal capsule must contain, if it is to produce an emulsion upon moistening, at least two substances, namely, an emulsifying agent and an oily or waxy substance that is capable of lubricating mucous tissues and being emulsified by water. These two substances should be present in the film or coating in amounts preferably within the range between approximately 0.75 and approximately 1.5 parts by weight of lubricating substance to each part by weight of emulsifying agent, which are higher ratios of emulsifying agent than are normally used to produce emulsions of such lubricating substances in large amounts of water. Although ratios outside of this specified range may be used, a relatively high ratio of emulsifying agent to lubricating substance is required to produce the coated gelatin capsules of this invention that have the specified properties.

Emulsifying or wetting agents suitable for use in the preparation of coating in accordance with this invention are dioctyl sodium sulfosuccinate, polyoxyethylene (20) sorbitan monooleate (polysorbate 80, U.S.P.), and other polyoxyethylene sorbitan fatty acid esters, sorbitan fatty acid esters, polyethylene glycols, sulfated fatty alcohols, fatty alcohol sulfonates, polymers, such as polyvinylpyrrolidone, etc.

Emulsifiable substances, that are also useful as lubricating agents, and which are suitable for use in the preparation of coatings in accordance with this invention are, for example, petrolatum, liquid petrolatum, paraffin waxes, beeswax, carnauba wax, stearic acid, magnesium stearate, fatty alcohols, silicone oils, silicone greases, silicone waxes, etc.

From each of the two foregoing groups, one or more substances may be selected and combined to produce suitable combinations that are capable of producing the desired film or coating. Other optional substances or additives which may be suitably added to the coating compositions to produce coatings or films that adhere more firmly to the gelatin shell or envelope or that are less discontinuous include, for example, silicone resins, polymethacrylic esters, and other polymers, and other substances known to produce these desirable effects.

The film or coating may be applied to the preformed gelatin capsules containing medicaments in the form of a mixture or composition consisting of (a) a melt of the emulsifying agent and emulsifiable essentially water-insoluble solid lubricating substance, or (b) an aqueous emulsion or dispersion of the two solid substances, or (c) a solution in a solvent in which gelatin is substantially insoluble, such as acetone or trichloroethylene. After contacting the capsules with one of the foregoing film-forming compositions in a rotating or revolving tablet-coating drum or other suitable container and tumbling or shaking the same, the coated capsules are cooled to permit the melted coating to solidify or, in the event that solutions or emulsions were used (b or c hereinbefore), the mass is allowed to drain with or without aspiration, or cold air is blown therethrough to expel the solvent.

Medicaments or medicinal substances which may be contained in the core of the gelatin capsules or distributed throughout the gelatin in accordance with this invention are those which are normally used or prescribed. Typical coatings and methods by which they may be applied to such gelatin capsules are illustrated in the examples which follow.

*Example I*

A mixture of 6.0 grams of polyoxyethylene sorbitan tristearate, which is a waxy, water-soluble liquid having a specific gravity between 1.03 and 1.08, and 4.0 grams of paraffin wax having a melting or softening point between 50 and 57° C. and a specific gravity of about 0.90, is heated with stirring until a clear melt is obtained. The molten mass is then allowed to solidify by cooling and is broken into lumps. These lumps are then placed in a rotating tablet-coating drum containing several gelatin rectal capsules containing a medicament and the drum is tumbled until the waxy lumps have formed a continuous film upon the capsules. The resulting products were dry coated capsules which become slippery when moistened.

*Example II*

Lumps of a clear melt prepared exactly as in Example I were dissolved in trichloroethylene and the solution was then placed in a jar containing the same gelatin rectal capsules that were used in Example I. After allowing the excess solution to drain from the capsules, a stream of cold air was blown into the jar to expel the remaining solvent. The resulting products were similar to the coated capsules of Example I and likewise became slippery when moistened.

*Example III*

A mixture of 10.0 grams of dioctyl sodium sulfosuccinate emulsifying agent, 10.0 grams of stearic acid, and 5.0 grams of water were melted together and were then stirred in a minimum quantity of water to produce a thick emulsion. The emulsion thus prepared was applied to gelatin rectal capsules containing a medicament in a rotating tablet-coating drum and tumbled as in Example I. The resulting products were similar to the coated capsules of Example I and likewise became slippery when moistened.

Any water or moisture remaining on the surface of the capsules can be removed by adding acetone or trichloroethylene to the drum and subsequently blowing out the adherent water together with the acetone or trichloroethylene with a stream of cold air.

The gelatin rectal capsules of this example can also be coated with a solution of the foregoing melt in acetone or trichloroethylene in accordance with the method described in Example II, expelling any of the remaining solvent together with some or all of the water that was used to melt the two components of the coating by blowing a stream of cold air through the mass of capsules.

*Example IV*

Eight (8.0) grams of sulfated lauryl alcohol (a Gardinol type of emulsifying agent) was dissolved in 6.0 grams of water, sodium hydroxide being added to produce a clear solution, after which 6.0 grams of stearic acid were added to the solution and the mixture was stirred until a homogenous emulsion was formed. This emulsion was then used to coat gelatin rectal capsules containing a medicament in each of the manners described in Example III.

*Example V*

A suspension of the following substances was prepared in acetone:

| | Grams |
|---|---|
| Sulfated lauryl alcohol | 8.0 |
| Lauryl alcohol | 4.0 |
| Silicone grease | 2.0 |
| Octyl alcohol | 1.0 |
| Silicone resin | 0.5 |

Gelatin rectal capsules were coated with this suspension and blown with cold air as described in Example III. A suspension of these constituents in trichloroethylene instead of acetone can likewise be used to prepare similar products.

In accordance with the procedures described in the foregoing examples, homogeneous coatings having a flat or dull lustre are obtained which are resistant to tropical climatic conditions and do not stick or adhere to each other when packed closely together at the high temperatures prevailing in such regions. The administration of the thus-coated gelatin rectal capsules can be accomplished with or without preliminary mositening, in an effortless manner, and without any annoying circumstance.

Inasmuch as the foregoing specification comprises prefered embodiments of the invention which were selected for purposes of illustration, it is to be understood that modifications and variations may be made therein in known manner and as described herein without departing from the invention, whose scope is to be restricted only by the scope of the appended claims.

What is claimed is:

1. A gelatin capsule for administration rectally and embodying a medicament, the surface of which is coated with an essentially dry adherent continuous film whose melting or softening point is above a temperature of at least 50° C., which film contains a lubricating substance that is emulsifiable with water together with an emulsifying agent in such amounts that the coated capsule, upon contact with moisture, becomes slippery and non-adherent to mucous tissue.

2. A gelatin capsule as defined in claim 1 having the size and shape of a conventional rectal suppository.

3. A gelatin capsule as defined in claim 1 in which the emulsifiable lubricant that is a component of the film coating is a substance of the group consisting of petrolatum, paraffin waxes, beeswax, carnauba wax, stearic acid, magnesium stearate, fatty alcohols, silicone oils, silicone greases, and silicone waxes.

4. A gelatin capsule as defined in claim 1 in which the emulsifying agent that is a component of the film coating is a substance of the group consisting of dioctyl sodium sulfosuccinate, polyoxyethylene sorbitan fatty acid esters, sorbitan fatty acid esters, polyethylene glycols, glyceryl monostearate, sulfated fatty alcohols, fatty alcohol sulfonates and polyvinylpyrrolidone.

5. A gelatin capsule as defined in claim 1 in which the film is composed of an amount of lubricating substance and emulsifying agent within the range of 0.75 to 1.5 parts by weight of lubricating substance to each part by weight of emulsifying agent.

6. A gelatin capsule for administration rectally that contains a medicament, the surface of which is coated with an essentially dry adherent continuous film consisting essentially of a mixture of paraffin wax having a melting point between 50 and 57° C. and polyoxyethylene sorbitan tristearate.

7. A gelatin capsule for administration rectally that contains a medicament, the surface of which is coated with an essentially dry adherent continuous film consisting essentially of a mixture of stearic acid and dioctyl sodium sulfosuccinate.

8. A gelatin capsule for administration rectally that contains a medicament, the surface of which is coated with an essentially dry adherent continuous film consisting essentially of a mixture of stearic acid and sulfated lauryl alcohol.

9. A gelatin capsule for administration rectally that contains a medicament, the surface of which is coated with an essentially dry adherent continuous film consisting essentially of a mixture of sulfated lauryl alcohol, lauryl alcohol, octyl alcohol, a silicone grease and a silicone resin.

10. A process for producing a gelatin capsule for administration rectally and containing a medicament, which capsule is coated with a film that becomes slippery and non-adherent to mucous tissue upon contact with moisture, which comprises applying to a preformed gelatin capsule a mixture containing an emulsifiable essentially water-insoluble lubricating substance and emulsifying agent therefor, the said mixture being applied to the capsule in the form of a homogeneous melt of the emulsifying agent and lubricating substance and subsequently treating the capsule to which said mixture has been applied to leave a dry continuous film on the capsule that is also resistant to tropical climatic conditions.

11. A process for producing a gelatin capsule for administration rectally and containing a medicament, which capsule is coated with a film that becomes slippery and nonadherent to mucous tissue upon contact with moisture, which comprises applying to a preformed gelatin capsule a mixture containing an emulsifiable essentially water-insoluble lubricating substance and an emulsifying agent therefor, the said mixture being applied to the capsule in the form of a solution of the emulsifying agent and lubricating substance in a solvent in which gelatin is substantially insoluble, and subsequently treating the capsule to which said mixture has been applied to leave a dry continuous film on the capsule that is also resistant to tropical climatic conditions.

12. A process as defined in claim 11 in which the mixture of substances is applied to the prepared gelatin capsule as a solution in a solvent of the group consisting of acetone and trichloroethylene.

13. A process for producing a gelatin capsule for administration rectally and containing a medicament, which capsule is coated with a film that becomes slippery and non-adherent to mucous tissue upon contact with moisture, which comprises applying to a preformed gelatin capsule a mixture containing an emulsifiable essentially water-insoluble lubricating substance and an emulsifying agent therefor, the said mixture being applied to the capsule in the form of an emulsion of the emulsifying agent and lubricating substance, and subsequently treating the capsule to which said mixture has been applied to leave a dry continuous film on the capsule that is also resistant to tropical climatic conditions.

14. A process for producing a gelatin capsule for administration rectally and containing a medicament, which capsule is coated with a film that becomes slippery and non-adherent to mucous tissue upon contact with moisture, which comprises applying to a preformed gelatin capsule a mixture containing an emulsifiable essentially water-insoluble lubricating substance and an emulsifying agent therefor, the said mixture being applied to the capsule in the form of a suspension of the emulsifying agent and lubricating substance, and subsequently treating the capsule to which said mixture has been applied to leave a dry continuous film on the capsule that is also resistant to tropical climatic conditions.

References Cited by the Examiner

UNITED STATES PATENTS

| | | | |
|---|---|---|---|
| 2,191,678 | 2/40 | Nitardy et al. | 167—82 |
| 2,538,127 | 1/51 | Saunders et al. | 167—64 |
| 2,738,303 | 3/56 | Blythe | 167—82 |
| 2,854,378 | 9/58 | Buckwalter | 167—64 |
| 2,875,130 | 2/59 | Grass | 167—82 |

FOREIGN PATENTS 455,732  10/36  Great Britain.

OTHER REFERENCES

J.A.P.A., Vol. XLVIII, No. 6, June 1959, pp. 353–355.

JULIAN S. LEVITT, *Primary Examiner.*

MORRIS O. WOLK, FRANK CACCIAPAGLIA, JR.
*Examiners.*